United States Patent [19]

Ramsbro

[11] Patent Number: 4,925,168

[45] Date of Patent: May 15, 1990

[54] VISE

[75] Inventor: Börje K. H. Ramsbro, Djursholm, Sweden

[73] Assignee: System 3R USA, Inc., Pompton Plains, N.J.

[21] Appl. No.: 252,038

[22] Filed: Sep. 30, 1988

Related U.S. Application Data

[63] Continuation of Ser. No. 839,947, Mar. 17, 1986, abandoned.

[30]. Foreign Application Priority Data

Mar. 18, 1985 [SE] Sweden ........ 8501309

[51] Int. Cl.[5] ........ B23Q 3/02

[52] U.S. Cl. ........ 269/136; 269/247; 269/251; 269/257

[58] Field of Search ........ 269/240, 244, 245, 250–253, 269/257, 134, 136, 242, 247, 256

[56] References Cited

U.S. PATENT DOCUMENTS

| | | | |
|---|---|---|---|
| 565,425 | 8/1896 | Bolte et al. . | |
| 1,120,466 | 12/1914 | Pegley et al. . | |
| 1,124,764 | 1/1915 | Lloyd . | |
| 1,125,207 | 1/1915 | Streeter et al. . | |
| 1,163,145 | 12/1915 | Gross | 269/251 |
| 1,454,993 | 7/1921 | Bothwell . | |
| 2,299,632 | 10/1942 | Kochorosky | 269/136 |
| 2,373,384 | 4/1945 | Cross et al. | 90/60 |
| 2,411,059 | 11/1946 | Rubenstein | 269/136 |
| 2,437,131 | 3/1948 | Shaw | 24/249 |
| 2,806,411 | 9/1957 | Backman | 90/59 |
| 2,861,492 | 11/1958 | Hokanson | 81/38 |
| 3,002,726 | 10/1961 | Ford | 269/256 |
| 3,089,708 | 5/1963 | Long | 279/123 |
| 3,232,602 | 2/1966 | Bernhard | 269/240 X |
| 3,384,948 | 12/1968 | Flegel | 29/283 |
| 3,416,784 | 12/1968 | Wermuth et al. | 269/136 |
| 3,514,092 | 5/1970 | Lassy | 269/134 |
| 3,791,640 | 2/1974 | Clugage | 269/136 |
| 4,240,621 | 12/1980 | Daddato | 269/264 |

FOREIGN PATENT DOCUMENTS

| | | | |
|---|---|---|---|
| 52379 | 5/1982 | European Pat. Off. | 269/257 |
| 135972 | 8/1901 | Fed. Rep. of Germany . | |
| 712241 | 10/1941 | Fed. Rep. of Germany . | |
| 1191182 | 10/1959 | France . | |
| 1432219 | 2/1966 | France . | |
| 54938 | 3/1967 | German Democratic Rep. | 269/136 |
| 73165 | 8/1916 | Switzerland | 269/253 |
| 283847 | 10/1952 | Switzerland . | |
| 552251 | 3/1943 | United Kingdom . | |

*Primary Examiner*—Judy Hartman

*Attorney, Agent, or Firm*—Fleit, Jacobson, Cohn, Price, Holman & Stern

[57] ABSTRACT

A vise for clamping a workpiece in an adjusted position during operation on the workpiece by a tool, particularly the cutting wire of an electric wire cut discharge machine. For maintaining accuracy of the clamped workpiece and still occupying a minimum of space by the vise within the working range of the machine tool the vise is provided with a first fixed jaw and a second jaw movable along ways forming a reference surface. Wedging abutment surfaces and abutting surfaces are formed on the bed of the vise and on the second jaw, respectively, which engage during clamping the workpiece for preventing bending of the ways which allows a low profile construction of the vise.

3 Claims, 3 Drawing Sheets

VISE

This application is a continuation of application Ser. No. 839,947, filed Mar. 17, 1986, now abandoned.

TECHNICAL FIELD

This invention relates to vises and is particularly applicable to machine vises which hold a metal workpiece in position to be operated on by a tool such as preferably the electric wire of a wire cut electric discharge machine.

BACKGROUND ART

In precision work for which electric discharge machining is particularly suitable, it is important that the workpiece into which a predetermined structure has to be cut is held firmly against the bed of the vise. There is a tendency for the workpiece to move upwardly a slight amount from the bed when tightening the jaws of the vise. Such uncontrolled movement of the workpiece during tightening of the jaws preventing meeting close tolerances which are inherent in precision working.

Known wire cut electric discharge machines typically offer only a limited working range within which the workpiece has to be adjusted and held by the vise. Such working range is limited by the feeding means of the wire and the removing means of the wire between which the electric wire runs during wire cutting operation on the workpiece. It is therefore important that the vise for holding the workpiece within the working range occupies as little space as possible.

In U.S. Pat. No. 4,411,415 a compound jaw plate for a vise is disclosed wherein a jaw attaching plate and a workpiece engaging plate are connected by two pivtable links surrounded by an elastomeric material. The jaw attaching plate is adapted to be mounted to a jaw of the vise, and the workpiece engaging plate grips the workpiece to be held by the vise. The links are positioned at downward acute angles relative to the intended direction of applied force for gripping a workpiece. This device exerts a force on a gripped workpiece urging it towards the bed of the vise.

This known vise is intended for use in a milling cutter or the like, and therefore, has a very bulky construction. Moreover, an adjustment of a workpiece clamped inbetween the jaws of said vise cannot meet the very high requirements as to the accuracy of adjustment which has to be maintained throughout the complete electroerosive cutting operation on the workpiece. Typically, the workpiece has to be adjusted in the vise with an accuracy in the range of microns. Such adjustment cannot be obtained by the known vise because the pivotable mounting of the links to the workpiece gripping plate and to the jaw attaching plate of the jaw inherently gives cause to deviations in adjustment of the workpiece which exceed beyond the desired range of tolerance.

SUMMARY OF THE INVENTION

It is therefore an object underlying the invention to provide a vise for holding a workpiece with very narrow tolerances of adjustment with respect to given references which is particularly adapted for the use in electric discharge machines. Moreover, a vise is to be provided which is of very small construction thereby occupying only minimum space within the working range of an electric discharge machine while being able to clamp a workpiece the dimensions of which may be selected from a wide range.

For accomplishing these objects the invention contemplates according to one important aspect a vise for clamping a work-piece with very high accuracy relative to a predetermined reference, comprising a bed upon a reference surface of which the workpiece may be adjusted and clamped, a first fixed jaw formed from said bed and projecting above said reference surface, a second jaw moving upon said reference surface towards to and away from said first jaw when operating a drive means coupled to said second jaw and extending within a longitudinal channel, said channel being formed within said bed and being open to the reference surface through a longitudinal slot, the first jaw and the second jaw and the bed, at least in the vicinity of said jaws, having low outer profile, the vise further comprising at least two abutment surfaces provided on said bed, and at least two abutting surfaces provided on said second jaw, said abutment surfaces and said abutting surfaces extending parallel to said channel at said reference surface and being inclined with respect to said reference surface and, during clamping the workpiece, cooperate in such a way that walls of said bed which surround said channel and said slot are prevented from bending away.

According to another aspect of the invention, at least one of the jaws includes a clamping plate which, in a one-piece construction is mounted to the body of the jaw through at least one thin bridge directed downwardly to the reference surface.

According to still another aspect of the invention the bed is provided with means for levelling the reference surface which included two lateral incuts each driven from one of the opposite side surfaces of the bed along a stepped line to the vicinity of the center of the bed. By means of a pair of set screws both end positions of the bed may be lifted wherein one of the steps in each incut forms a limit for excess lifting.

The invention allows for a very thin and flat construction of a vise which at least in one dimension occupies a minimum of space and still allows for accurately clamping workpieces ranging from very small to medium-sized rectangular pieces. Thus, the invention is particularly useful in adjusting and holding a workpiece within the workrange of a wire cut electric discharge machine.

DETAILED DESCRIPTION OF THE INVENTION

The invention will now be more particularly described with reference to the accompanying drawings. It will be understood that the hereinafter described embodiments of the invention are shown by way of illustration only and not as a limitation of the invention. The principles and features of this invention may be employed in various and numerous embodiments and in conjunction with other types of vises without departing from the scope of the invention.

Figures 1, 2, 4, 5, 6, 12:
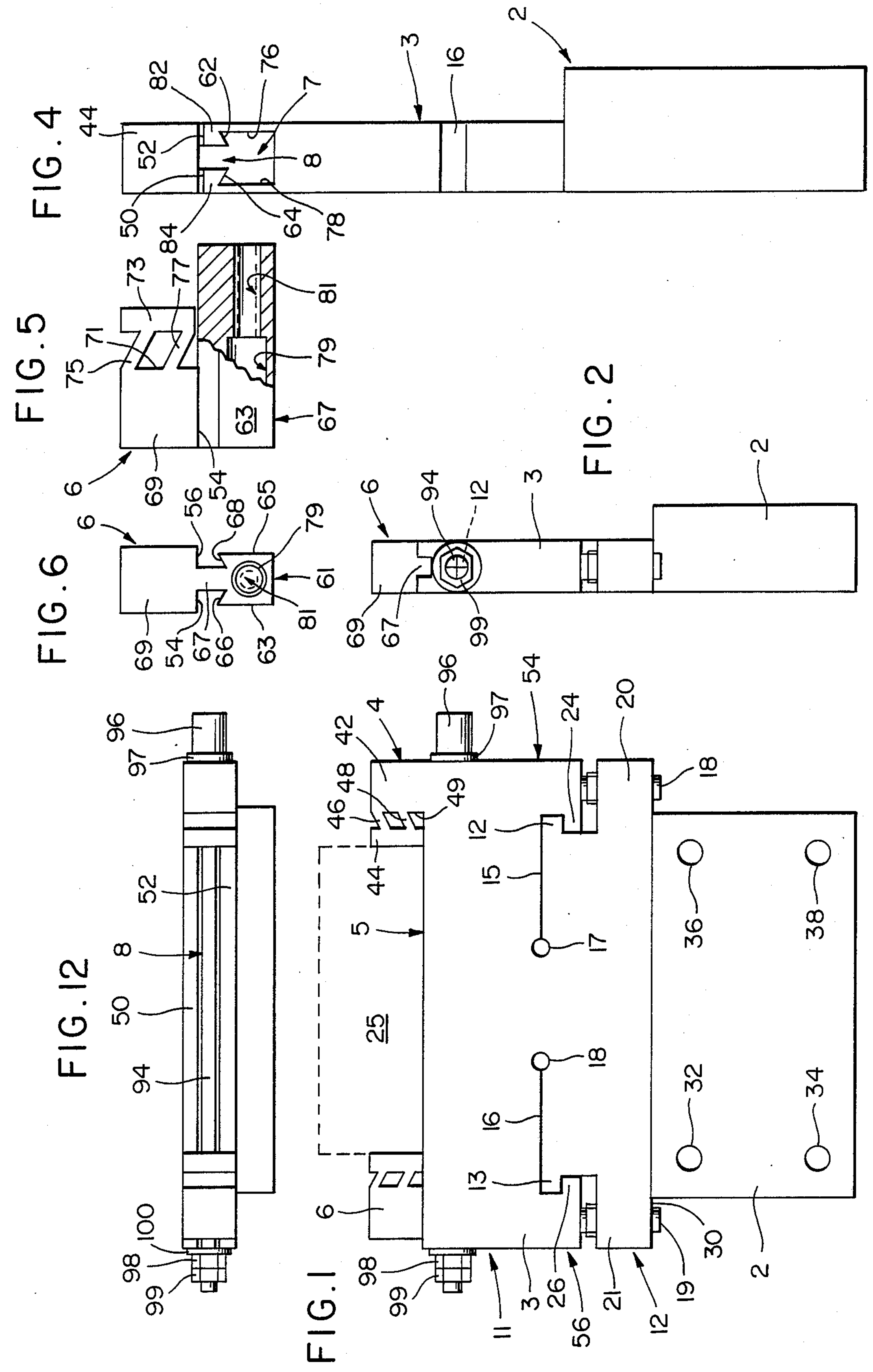
FIG. 1 is a plan view of a vise incorporating the features of the invention.
FIG. 2 is a side view of the vise according to FIG. 1. seen from left-hand side of FIG. 1.
FIG. 4 is a side view similar to FIG. 2 of the bed according to FIG. 3.
FIG. 5 is a plan view of second jaw for the vise according to FIG. 1, with parts broken away.
FIG. 6 is an end view of the second jaw of FIG. 5 seen from the left.
FIG. 12 is a top view of the assembled vise according to FIG. 1.

The assembled vise according to FIGS. 1, 2 and 12 comprises a base plate 3 forming a bed of the vise which has a substantially rectangular configuration and is machined from steel.

The base plate 3 has substantially flat outer surfaces. In the embodiment of the invention shown in the drawings, one dimension of the base plate is much smaller than the other ones so that the base plate 3 is very thin in lateral view and in top view (FIGS. 2, 12) as compared to known vises.

From the lower end surface 30 of the base plate 3 extends a thick, massive mounting block 2 through which a number of mounting bores such as the foreshown mounting bores 32, 34, 36, 38 are drilled. The mounting bores allow the vise to be fastened to any not shown substrate by bolts or the like. Base plate 3 and mounting block 2 are machined from one piece of metal.

From the upper end face 5 opposite to the lower end face 30 two ways 50, 52 are formed which run lengthwise with the bed of the vise parallel to each other. Both ways 50, 52 are made extremely flat and define a common plane. Thus ways 50, 52, may serve as a reference surface for adjusting a rectangular workpiece 25 shown by dashed lines in FIG. 1 in a wire cut electric discharge machine (not shown).

From one end of the upper end surface 5 of the base plate 3 a fixed jaw 4 projects upwards above the upper end face. The fixed jaw 4 comprises a jaw body 42 the side surfaces of which are formed as extensions of the adjacent surfaces of the base plate 3. A first clamping plate 44 is mounted through two parallel first bridges 46, 48 to the end face 49 of the first jaw body 42 which faces the ways 50, 52. Each first bridge 46, 48 has the same width as that one of the first jaw body 42 and that one of the first clamping plate 44 and extends downwards from the end face 49 with an acute angle. Thus, the first clamping plate 44 is held slightly above the proximate end of the ways 50, 52, slightly above the common plane thereof. The first clamping plate 44 together with the first bridges 46, 48 and the first jaw body 42 are made from one piece of metal.

Figure 10:
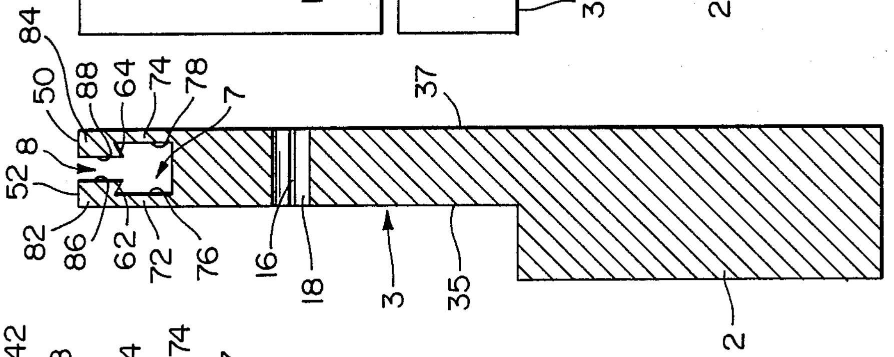
FIG. 10 is a view of the bed when cut along the line X—X taken is the direction of the arrows in FIG. 3.
Figure 11:
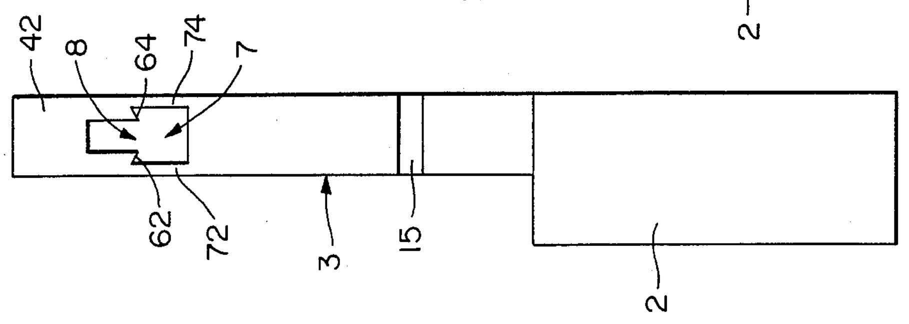
FIG. 11 is an end view of the bed according to FIG. 3 taken from the right-hand side.

Between ways 50, 52 a longitudinal slot 8 is cut into the bed forming base plate 3 which, see FIGS. 4, 10, 11, is defined by two opposite wall sections 82, 84 of the base plate 3 the inner surfaces of which extend parallel to the opposite outer surfaces 35, 37 of the base plate 3.

A longitudinal channel 7 of substantially rectangular cross section is suct into the bed directly below the slot 8 which communicates with said channel 7 so that the channel 7 opens to the reference surface through the longitudinal slot. The wall sections 72, 74 defining the longitudinal channel 7 are thinner than the upper wall sections 82, 84, and the inner surfaces 76, 78 of said wall section 72, 74 run parallel to the corresponding outer surfaces 35, 37 of the base plate 3. Each transition from the inner surfaces 86, 88 of upper wall sections 82, 84 to the inner surfaces 76, 78 of wall sections 72, 74 is formed to a wedge directed to the interior of the channel 7 thereby providing abutment surfaces 62, 64 which are inclined upwardly and outwardly with respect to the reference surface.

The vise according to the invention includes a second jaw shown in FIGS. 5 and 6. The second jaw 6 has a guiding portion 61 of a shape which is adapted to fit into the longitudinal channel 7. Thus, the guiding portion has opposite lateral surfaces 63, 65 adapted to slide along the inner surfaces 76, 78, respectively, of the channel 7. Said surfaces 63, 65 are extremely flat and run exactly parallel to each other and perpendicular to two slide surfaces 54 and 56 which are formed from the lower end of body 69 besides and above the neck 67. The guiding portion 61 has an upper neck 67 which fits into the slot 8. The transition from the neck 67 to each of the lateral surfaces 63 and 65 is made to an upwardly directed groove thereby providing abutting surfaces 66, 68 which cooperate with the abutment surfaces 62,64, respectively, when the guiding portion 61 is inserted into the channel 7 and the slot 8.

The head of the second jaw 6 comprises a body 69 to the front end 71 of which a second clamping plate 73 is mounted through a pair of parallel second bridges 75, 77. Each bridge is directed downwardly to the guiding portion 61.

As best seen from FIG. 5, the guiding portion 61 is longer than the head of the second jaw and is provided with a longitudinal bore 79. The front section 81 having a distance to the body 69 of the second jaw 6 has a reduced diameter and is threaded inwardly for engaging an outwardly threaded spindle 94 (FIG. 12).

For assembling the vise according to the invention, the spindle 94 is screwed into the thread of the front section 81 of bore 79 of second jaw 6, and the guiding portion 61 together with the spindle 94 is inserted into channel 7 and slot 8 from the left side when viewing FIG. 1 such that the clamping plates 44 and 73 are facing each other. The second jaw 6 rides then on the reference surface, i.e. surfaces 54 and 56 ride on ways 52 and 50, respectively. As the spindle projects on either side of the base plate 3 from the channel 7, it is secured therein by a handle 96 fixed to the end of spindle 94 and a washer 97 put on the right end of the spindle 94 projecting from the channel 7 at the right side of base plate 3. The opposite end of the spindle is secured by a pair of nuts 98, 99 and a washer 100 which are connected to the left end of the spindle projecting from the left end of channel 7, see FIGS. 1 and 12.

By turning the first handle 96 clockwise and counterclockwise the spindle 94 is correspondingly rotated and consequently the second jaw is sliding on the ways 50, 52 of the bed.

When clamping the workpiece 25 by exerting a clamping force through the second jaw by rotating the handle 96 in one direction the workpiece 25 is urged on the ways 50, 52 by the bridges 46, 48 and 75, 77, respectively. On the other hand, the body 69 of the second jaw is exposed to forces which tend to rotate said body 69 in a counterclockwise direction (FIG. 1) which causes engagement of the abutting surfaces 66, 68 to the abutment surfaces 62, 64, respectively, thereby preventing that the walls 82, 84 and 72 74 may bend outwardly so that these walls are maintained parallel to the surfaces 63, 65 of the second jaw 6.

On the other hand the force tending to rotate the body 69 of the second jaw in counter clockwise direction when viewing FIG. 1 may cause a slight downward deformation of ways 50. 52. Such deviation may be removed by the levelling means provided for in the vise according to another aspect of the invention.

Two incuts 15, 16 are provided in the base plate 3, a first incut 15 from the right lateral surface 54 and the second incut 16 from the opposite lateral surface 56 of the base plate 3. Each incut 15, 16 penetrates completely the thickness of the base plate and follows a stepped line to a terminating hole 17, 18, respectively, in the vicinity of the center of the base plate 3. Both holes 17, 18 are located symmetrically to the center and have the same distance to the reference surface. The stepped line of each incut 15, 16 creates an outwardly extending nose 12, 13. The incuts 15, 16 divide the base plate into an upper section 11 and into a lower section 12 which are combined by a portion of the material between the terminating holes. In each outer end 20, 21 of the lower section an upwardly directed and inwardly threaded hole 22 is cut into which a set screw 18, 19 is threadingly inserted. The upper end face of each set screw abuts the opposite, lower face of the upper section 11. By turning anyone of the sets screws 18, 19 the corresponding portion of the upper section 11 can be lifted slightly. An inwardly directed arm 24, 26 of the upper section underlies the associated outwardly extending nose 12, 13, respectively, so that abutment of each arm to the corresponding nose forms a stop for the upward bending of the corresponding portion of the upper section 11 of the base plate 3. Thereby, in the event the reference surface is rendered convex when clamping the workpiece 25 such deviation can be removed by turning the corresponding sets screw thereby lifting slightly the associated portion of the upper section, and levelling the ways 50, 52 into the reference surface.

Figure 7:
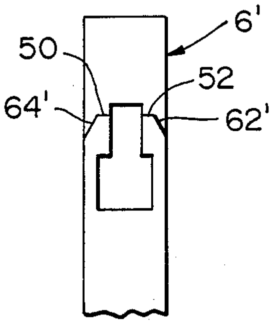
FIG. 7 is an end view similar to FIG. 4 of a second embodiment of the jaw according to the invention.
Figure 8:
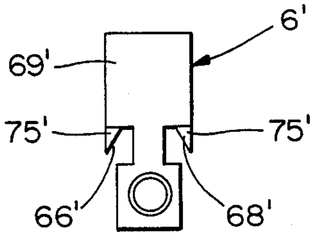
FIG. 8 is an end view similar to FIG. 6 of a second embodiment of the second jaw.
Figure 9:
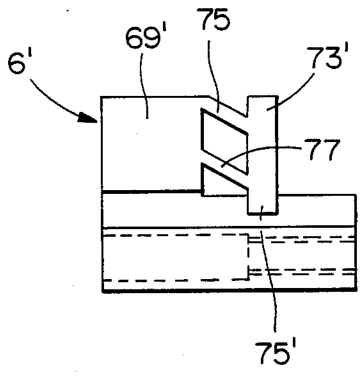
FIG. 9 is a side view of the second jaw according to the second embodiment of the invention.
Figure 3:
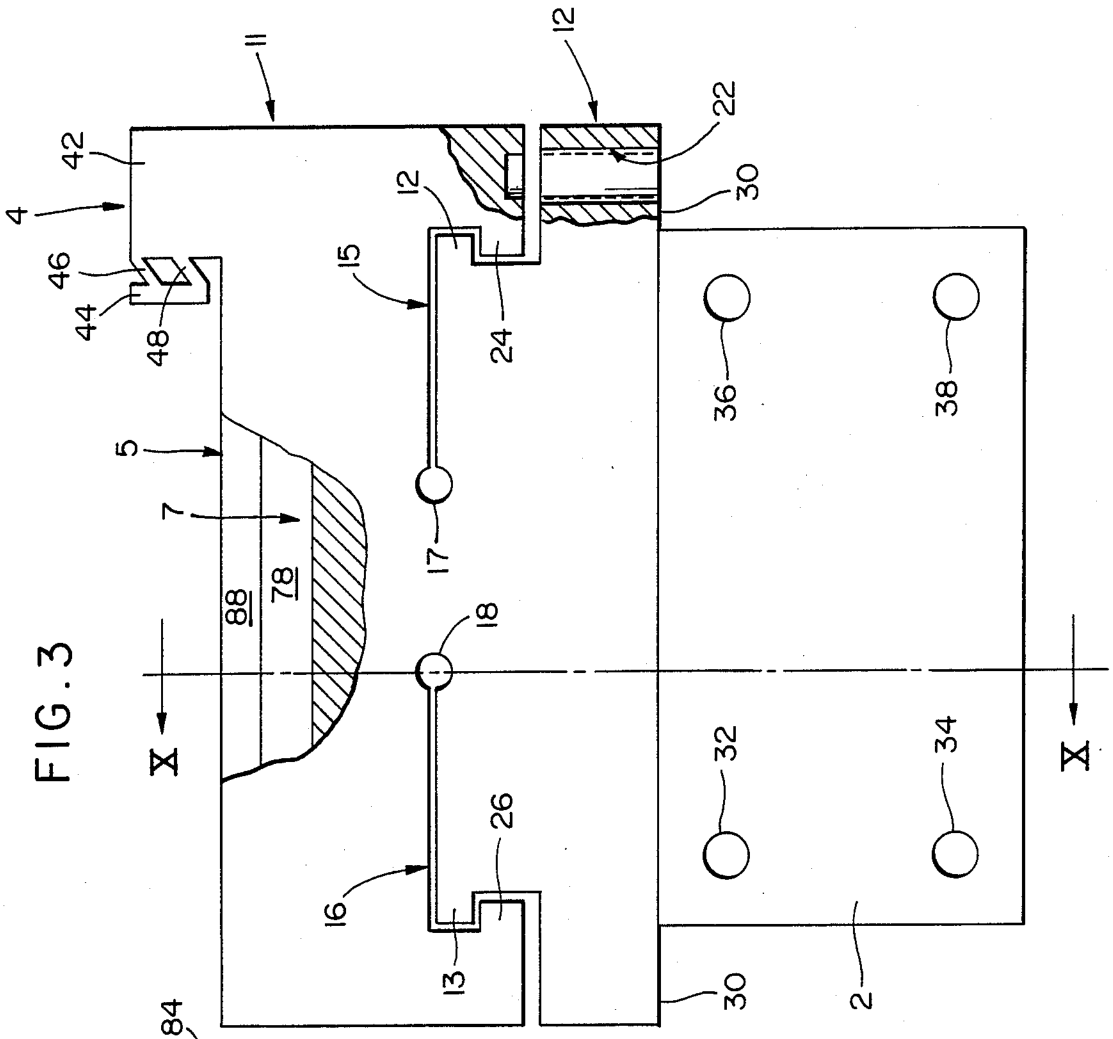
FIG. 3 is a plan view of the bed of the vise, with parts broken away.

FIGS. 7, 8, 9 show a second embodiment of the invention as far as the abutment surfaces and the abutting surfaces are concerned. In this embodiment each way 50, 52 is provided at its outer longitudinal edge by a downwardly inclined abutment surface 62', 64'. Moreover the clamping plate 73' of the second jaw 6' is provided with downwardly extending skirts 75' from which abutting surfaces 66', 68' are formed which are inclined downwardly and outwardly relative to the reference surface.

When clamping a workpiece with the second embodiment of the invention, the downwardly extending skirts abut the downwardly and outwardly directed abutment surfaces and thereby prevent that the walls defining the slot and the channel may bend out of a straight line. In this embodiment the wedges at the transitions from the slot to the channel are omitted. Said skirts may be provided alternatively at the opposing lower lateral ends of body 69' to jaw 6'.

Last not least, it is within the scope of the invention to form differently shaped mounting means from the lower surface 30 of the base plate 3. Instead of the mounting block 2 a shaft may be provided adapted to be inserted into a hydraulic chuck of an electric discharge machine. Depending on the intended actual use of the vise according to the invention different forms of mounting means can be provided for instead of the mounting block as shown in the above described embodiments of the invention.

What is claimed is:

1. Vice for clamping a workpiece with very high accuracy relative to a predetermined reference, comprising:
  a bed having a reference surface upon which the workpiece may be adjusted and clamped,
  a first fixed jaw formed from said bed and projecting above said reference surface,
  a second jaw movable upon said reference surface towards and away from said first jaw when operating a drive means coupled to said second jaw and extending within a longitudinal channel, said channel being formed within said bed and being open to the reference surface through a longitudinal slot, wherein the first jaw, the second jaw and the bed, at least in the vicinity of said jaws, have a low outer profile,
  at least two abutment surfaces provided on said bed,
  at least two abutting surfaces provided on said second jaw, said abutment surfaces and said abutting surfaces extending parallel to said channel and being inclined with respect to said reference surface and during clamping a workpiece, cooperating to prevent walls of the bed which surround said channel and said slot from bending,
  wherein the bed is formed from a base plate formed with at least one incut having a major portion which extends parallel to the reference surface,
  wherein the incut follows a stepped line thereby forming a nose for stopping broadening of the incut transversely to the reference surface wherein narrowing of the incuts is adjustably limited by a screw element.

2. A vise for securing a workpiece in an electrical discharge machine, the vise comprising:
  a base plate formed from a unitary piece of material having a thickness substantially less than its length or width, said base plate defining a reference surface lying lengthwise in a plane substantially perpendicular to the plane defined by the length and width of the base plate, means for gripping a movable jaw within said base plate, said means including a lengthwise channel defined by said base plate being open to said reference surface through a lengthwise slot wherein the channel and slot define a pair of lengthwise abutment surfaces inclined with respect to the plane of the reference surface and facing the interior of the channels;
  a fixed jaw unitary with said base plate having a jaw body projecting above said reference surface;
  said movable jaw being movable along said reference surface having a jaw body projecting above said reference surface and a jaw guide disposed within said channel, said jaw guide defining a pair of lengthwise inclined abutting surfaces parallel with said abutment surfaces of said base plate and in sliding engagement therewith, wherein during clamping of a workpiece, said abutment and abutting surfaces cooperate to draw a portion of said base plate adjacent said slot towards a portionof said movable jaw;
  drive means connected with said jaw guide for moving said movable jaw along said reference surface;
  leveling means for leveling concavities in the reference surface, that may be formed during a clamping operation, to a substantially planar condition, said leveling means including a pair of incuts through the thickness of the base plate, a portion of said incuts extending substantially parallel to said reference surface, said incuts extending from opposite side edges of the base plate toward a central region of the base plate to partially divide the base plate into an upper portion and a lower portion; and separating means located on both sides of said central region and extending between said upper portion and said lower portion for selectively separating said upper portion with respect to said lower portion about said central region of said base plate on each side of said central region.

3. The vise as claimed in claim 2, wherein each of said fixed and movable jaws include a clamping plate substantially perpendicular to said reference surface and connected with said jaw body through a pair of substantially parallel bridges extending from said jaw body to said clamping plate in a direction toward said reference surface.

* * * * *